(12) United States Patent
Lim

(10) Patent No.: US 6,181,821 B1
(45) Date of Patent: *Jan. 30, 2001

(54) PREDICTIVE SOURCE ENCODING AND MULTIPLEXING

(75) Inventor: Jae S. Lim, Winchester, MA (US)

(73) Assignee: Massachusetts Institute of Technology, Cambridge, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/848,845

(22) Filed: Apr. 30, 1997

(51) Int. Cl.[7] .................................................. G06K 9/36
(52) U.S. Cl. ............................................................ 382/232
(58) Field of Search ................................. 382/232–236, 382/238–240, 243; 358/261.4, 404, 426, 427, 444; 348/405, 409, 415, 417–420, 422

(56) References Cited

U.S. PATENT DOCUMENTS

| 4,903,317 | * | 2/1990 | Nishihara et al. | 382/232 |
| 5,168,374 | * | 12/1992 | Morimoto | 358/426 |
| 5,216,503 | | 6/1993 | Paik et al. | 358/133 |
| 5,265,180 | * | 11/1993 | Golin | 382/232 |
| 5,301,242 | * | 4/1994 | Gonzales et al. | 382/239 |
| 5,426,463 | * | 6/1995 | Reininger et al. | 348/405 |
| 5,452,102 | * | 9/1995 | Yokoyama et al. | 358/426 |
| 5,467,134 | * | 11/1995 | Laney et al. | 348/409 |
| 5,577,190 | * | 11/1996 | Peters | 395/501 |
| 5,666,161 | * | 9/1997 | Kohiyama et al. | 348/408 |
| 5,877,812 | | 3/1999 | Krause et al. | 348/385 |
| 6,005,620 | | 12/1999 | Yang et al. | 348/385 |

* cited by examiner

Primary Examiner—Jose L. Couso
(74) Attorney, Agent, or Firm—Fish & Richardson, P.C.

(57) ABSTRACT

Variable-rate encoding of a signal by processing the signal to determine the data rate demand over a time period for multiple values of an encoding parameter, such as a quantization parameter which affects the encoded data rate, and selecting a value for the encoding parameter with which to encode a segment of the time period. Determining the data rate demands of a set of image sequences and selecting a subset of the sequences based on the data rate demands, for example, to satisfy a storage volume constraint, and then encoding each of the selected subset of sequences for transmission or storage.

19 Claims, 4 Drawing Sheets

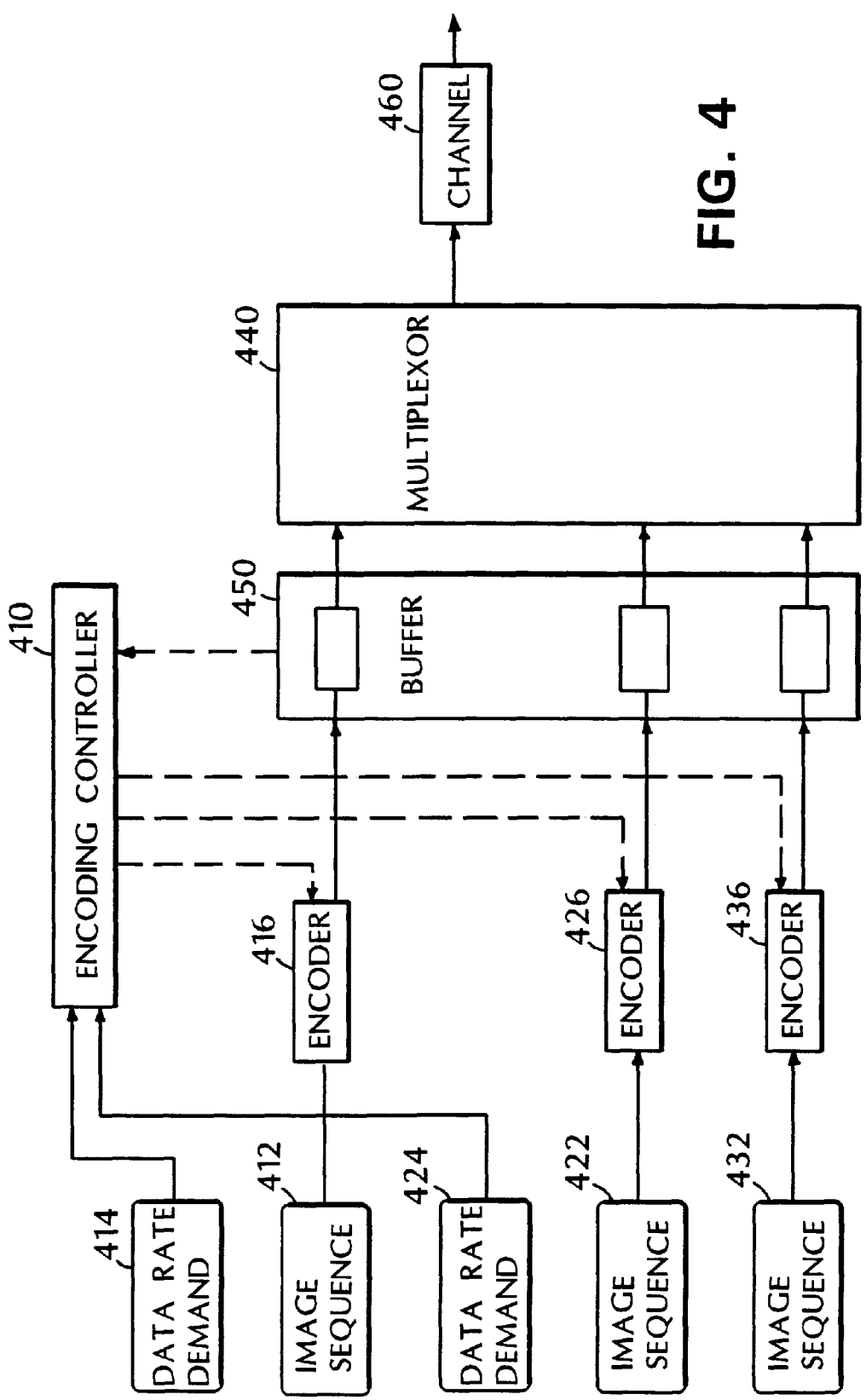

PREDICTIVE SOURCE ENCODING AND MULTIPLEXING

BACKGROUND OF THE INVENTION

This invention relates to encoding and multiplexing multiple signals for transmission or storage, and in particular relates to statistically multiplexing of multiple image sequences.

An image sequence encoded at a fixed image quality using a variable-rate encoder produces data at a time varying rate. The data rate, in general, depends on the characteristics of images being encoded, and with some encoding techniques, on the relationships of images being encoded to images nearby in the sequence. For example, images of a fast-moving scene will typically produce a higher data rate than those of a still scene. In addition different encoding techniques, producing different amounts of data, may be used for different images in the sequence. For example, some images may be encoded independently of other images, producing relative more data than other images encoded based on prediction from nearby images. The Motion Picture Expert Group MPEG-2 video encoding standard specifies such a variable-rate image encoding technique.

In addition to producing data at time varying rates at a fixed image quality, some image encoding techniques allow control over an encoding parameter such as a quantization parameter, thereby, indirect control over the image quality and the average output data rate. Reducing the quantization parameter in general reduces average data rate and image quality. For transmission over a capacity constrained channel, variable-rate output from an encoder is stored in a buffer before transmission. The quantization parameter can then be adjusted to control the average data rate. If the buffer contains a large backlog of data, the quantization parameter is reduced thereby resulting in the buffer being filled less quickly by the encoder. If there is a small backlog, the quantization parameter is increased. This type of feedback prevents exceeding the capacity of the buffer or emptying the buffer while using a relatively high image quality.

Multiplexing multiple encoded image sequences on a capacity constrained channel can be done by preallocating portions of the total capacity to individual image sequences. For example, in the case of a fixed-rate channel, each image sequence can be allocated a fixed fraction of the total capacity. However, if the fixed fraction is too small, an encoded image sequence may at times demand a higher data rate than its allocated fraction. If the fixed fraction is too large, there may be times when an encoded image sequence does not need its entire allocated capacity leaving unused channel capacity not available to other image sequences.

When multiple variable-rate encoded image sequences are multiplexed on a single channel, there may be times when one sequence needs a high data rate while another sequence may only need a relatively low data rate. Statistical multiplexing takes advantage of this phenomenon by not allocating fixed portions of the total channel capacity to particular image sequences. The overall sum of the data rates will be time varying. A control mechanism is generally needed to prevent exceeding the capacity of the channel.

FIG. 1 shows a statistical multiplexing arrangement in which image sequences 112, 114 are encoded by variable-rate image encoders 116, 118, fed to a bounded capacity buffer 122, and multiplexed in multiplexor 120, before passing through a fixed-data-rate communication path 124. An encoding controller 130 is responsive to the amount of data in buffer 122 and controls the data rates produced by encoders 116, 118 in a feedback arrangement in order to keep the amount of data in buffer 122 near a target value and not allowing the amount of data to exceed the capacity of the buffer or allowing the buffer to empty. The encoded data produced by encoders 116, 118 includes control information sufficient to decode the data even with a time-varying data-rate control.

SUMMARY OF THE INVENTION

In a first aspect, the invention provides an improved technique for variable-rate encoding a signal by processing the signal to determine the data rate demand over a time period for multiple values of an encoding parameter, such as a quantization parameter which affects the encoded data rate, and selecting a value for the encoding parameter with which to encode a segment of the time period. An advantage of the invention over a buffer feedback arrangement is that there may be times when the buffer has a large backlog resulting in feedback control to reduce a quantization parameter, when in fact future image sequences would have naturally produced sufficiently low data rates to allow a larger quantization parameter and therefore, indirectly, a higher image quality to be maintained. Thus, the invention can avoid unnecessary reduction in image quality.

In general, in the first aspect, the invention features encoding a first signal, wherein the encoding produces a first stream of encoded data having a variable data rate generally dependent on values of an encoding parameter, by processing the first signal to determine the data rate demand over a time period for each of a plurality of values of the encoding parameter, selecting a first value of the encoding parameter from the plurality of values based on the determined data rate demands, and encoding the first signal over a segment of the time period using the first value.

Preferred implementations may include one or more of the following features:

The processing, selecting, and encoding steps may be repeated for a plurality of time segments, with different values of the encoding parameter being selected for at least some time segments.

A second signal may be encoded, producing a second stream of encoded data having a variable data rate generally dependent on values of an encoding parameter, and the first and second data streams may be combined to form a combined data stream for transmission or storage, by processing the second signal to determine the data rate demand over the time period for each of a plurality of values of the encoding parameter, selecting a second value of the encoding parameter from the plurality of values based on the determined data rate demands, and encoding the second signal over the segment of the time period using the second value.

The first and second data streams may be multiplexed to form the combined data stream.

A relative delay between the first and the second data streams may be provided to reduce peaks in data rate demand of the combined data stream.

The combined data stream may be stored in a buffer of limited data volume.

The first and second data values may be selected to maintain a desired volume of data in the buffer.

The volume of data currently stored in the buffer may also be used in selecting the values of the encoding parameter.

The first and second signals may be prerecorded image sequences.

The combined data stream may be transmitted over a communication channel of limited data rate capacity.

The step of processing a signal to determine the data rate demand may include presenting each image in the sequence to a variable-rate encoder and recording the amount of data produced for that image for each of a plurality of values of the encoding parameter.

The encoding may include predictive encoding and the time segments over which the same value of the encoding parameter is used may be chosen so that the amounts of data produced by images in one segment are independent of the choice of quantization parameter in another segment.

At least some of the data rate demands may be approximations of the actual data rate demands.

In a second aspect of the invention, the data rate demands of a set of image sequences is determined and a subset of the sequences is selected based on the data rate demands, for example, to satisfy a storage volume constraint. Each of the selected subset of sequences is then encoded for transmission or storage.

In general, the second aspect features encoding for transmission or storage a set of image sequences, by processing the image sequences to determine the data rate demand of each over a time period, selecting a subset of the image sequences based on the determined data rate demands; and encoding each of the selected image sequences to form an encoded data stream for each, and combining the encoded data streams to form a combined data stream.

Preferred implementations may include one or more of the following features:

The combined data stream may be transmitted over a data rate constrained communication channel or stored on a data volume constrained storage medium, and the step of selecting a subset of image sequences may include selecting image sequences that produce a data rate or data volume consistent with the constraints of the communication channel or storage medium.

Processing the image sequences to determine the data rate demand of each may be done for each of a plurality of values of an encoding parameter, and selections of values of the encoding parameters may be made for the selected image sequences, with the selections being made to make the data rate or data volume consistent with the constraints of the communication channel or storage medium.

Other features and advantages of the invention will become apparent from the following description of preferred embodiments, including the drawings, and from the claims.

BRIEF DESCRIPTION OF THE DRAWINGS

FIG. 4 shows a combined predictive and feedback arrangement for encoding multiple image sequences including a sequence without a precomputed data rate demand.

DESCRIPTION OF THE PREFERRED EMBODIMENTS

Figure 1:
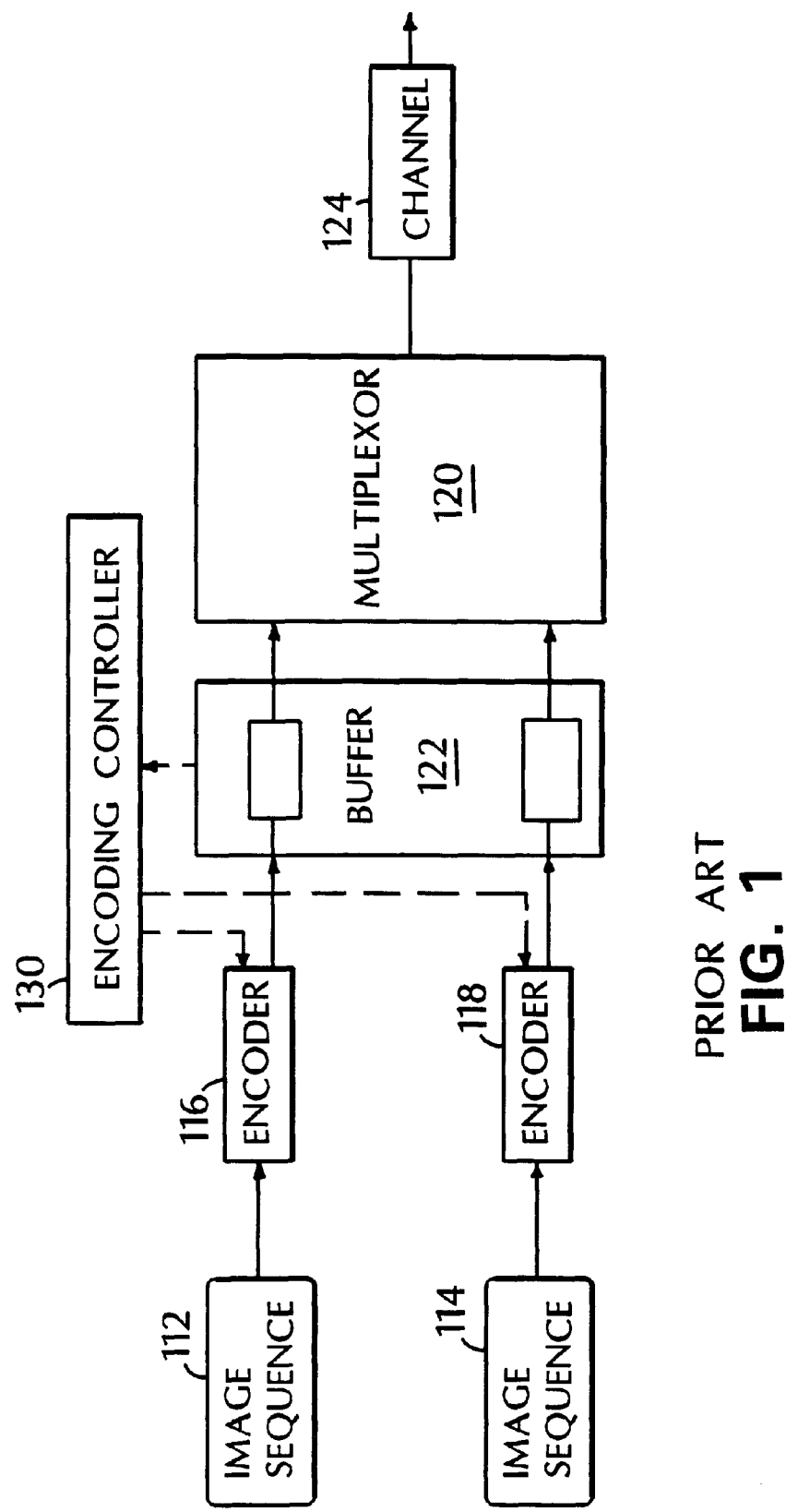
FIG. 1 shows a prior art buffer feedback arrangement used to control the data rates produced by multiple encoders for multiplexing over a communication channel.
Figure 2:
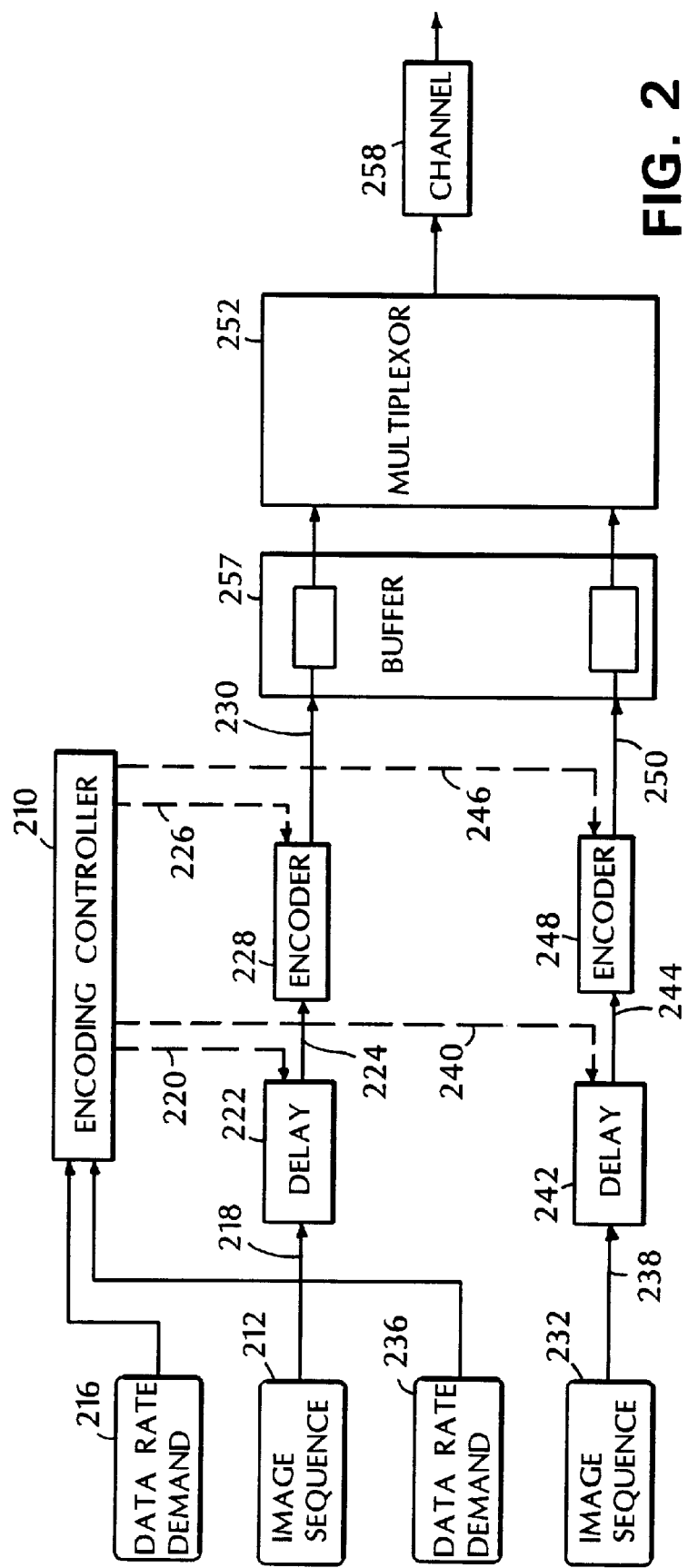
FIG. 2 shows a predictive arrangement for encoding two image sequences for multiplexing over a communication channel.

FIG. 2 shows a first embodiment in which two image sequences 212, 232 are encoded, buffered and multiplexed for transmission over a communication channel 258. A buffer 257 which accepts the outputs of the encoders has a bounded capacity and can accept data at a variable rate. Multiplexor 252 accepts data from the buffer at a fixed data rate and passes it to fixed-rate channel 258. In order to not exceed the input capacity of the buffer, encoding controller 210 controls the data rates produced by variable-rate image encoders 228, 248 such that when their outputs are combined in multiplexor 252, the data rate on data path 254 does not result in the buffer overflowing or emptying.

Variable-rate image encoders 228, 248 each have two inputs. Image data is provided on data paths 224, 244. Control paths 226, 246 are used to select from a discrete set of "quantization parameter" values. The data rate output from encoders 228, 248 depend indirectly on a selected quantization parameter Q. In general, the lower the quantization parameter selected, the smaller the amount of data produced for each image, on average, and also the poorer the image quality. In this embodiment, the image encoding technique implemented in encoders 228, 248 includes a quantization step followed by a lossless variable-rate encoding step. The selected quantization parameter Q affects the resolution of the quantization step. The variable-rate encoding step is such that if a lower resolution is used for quantization, less data (i.e., a smaller number of bits) is produced on average by the lossless variable-rate encoding step. Therefore, the amount of data that is produced in encoding any particular image depends on both the selected quantization parameter Q and characteristics of the image.

Image sequences 212, 232 are presented to variable-rate image encoders 228, 248 at fixed image rates (i.e., at a fixed number of images per second). Delay elements 222, 242 control fixed time offsets for each sequence by accessing image sequences 212, 232 over data paths 218, 238 and then presenting the sequences over data paths 224, 244 at the fixed image rates. The fixed time offsets of delay elements 222, 242 are controlled over a delay control paths 220, 240 by encoding controller 210.

In order to control the amount of data in buffer 257, encoding controller 210 controls the overall encoding process of both image sequences using delay control paths 220, 240 and image quality control paths 226, 246. In order to determine appropriate controls, encoding controller 210 must be able to predict their effect on the data rates on data paths 230 and 250. This determination is based on a precomputed data rate demand 216 associated with image sequence 212 and a precomputed data rate demand 236 associated with image sequence 232.

Figure 3A:
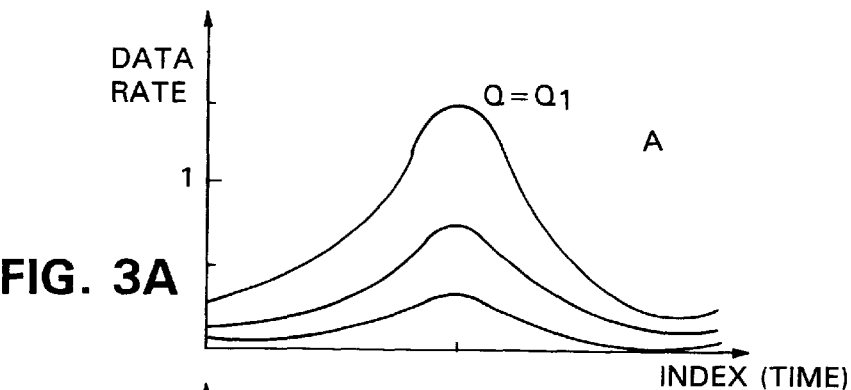
FIG. 3a and FIG. 3b illustrate precomputed data rate demands for two image sequences.
Figure 3B:
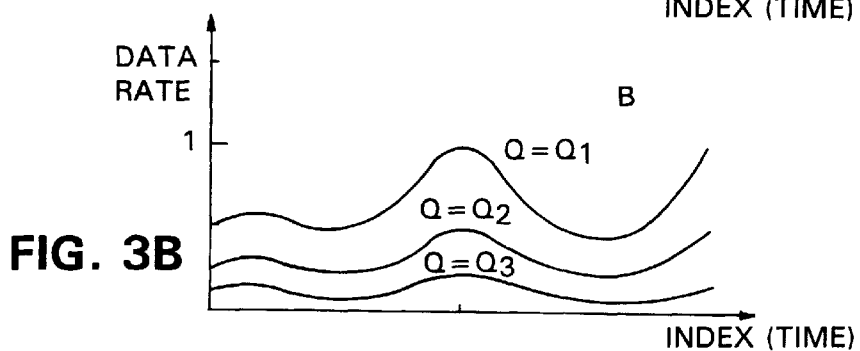
Figure 3C:
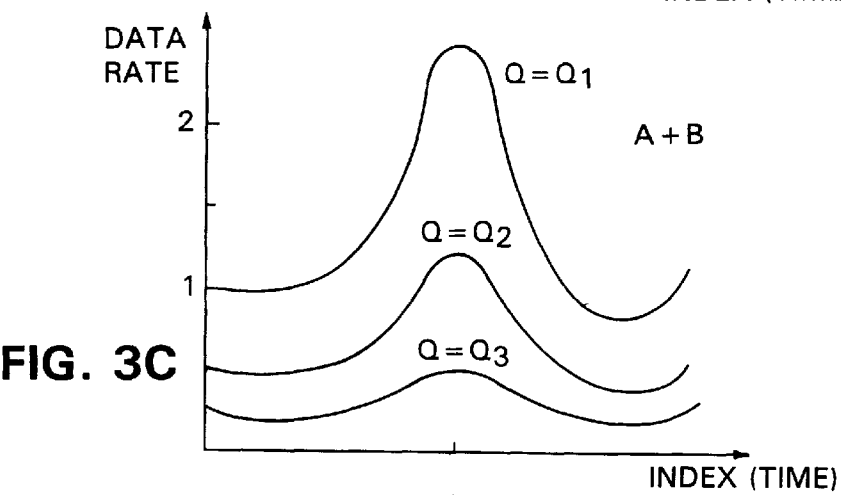
FIG. 3c and FIG. 3d illustrate the combination of precomputed data rates with and without a time delay.
Figure 3D:
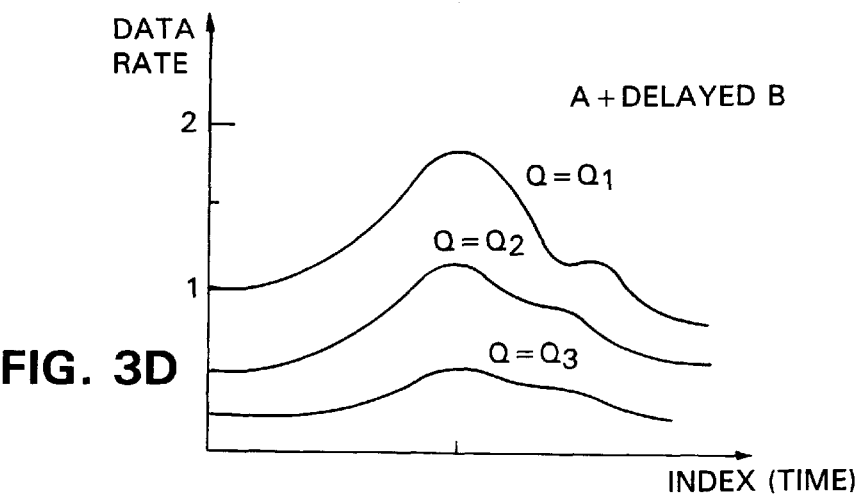

FIG. 3a and 3b illustrate precomputed data rate demands 216, 236. Each data rate demand includes predictions of the amount of data that would be produced by an encoder for each image in the corresponding sequence for several values of quantization parameter, indicated as $Q=Q_1$, $Q=Q_2$, and $Q=Q_3$. FIG. 3c shows the combined data rate demand if the two signals are multiplexed without any relative delay (for illustration assuming the buffer has zero capacity and that both encoders use the same value of quantization parameter). For a particular value of Q, the data rates shown in FIG. 3c are the algebraic sums of the data rates in FIG. 3a and FIG. 3b. FIG. 3d shows the data rate demand when the two signals multiplexed after delaying the second sequence by a fixed number of images. Note that the peak data rate for the highest quantization parameter ($Q=Q_1$) is lower in FIG. 3d than in FIG. 3c. Introducing the delay allows use of a larger quantization parameter and therefore a higher image quality, while not exceeding the constraints of the communication channel by avoiding times when both image sequences have high data rate demands. In practice with a non-zero capacity buffer, the effect of a delay on the amount of buffered data is more complex.

Referring again to FIG. 2, encoding controller 210 chooses the largest possible quantization parameter without exceeding the capacity of buffer 257. If the controller predicts that uses of the largest quantization parameter would indeed exceed the capacity of the buffer on the next or some future image, the planned quantization parameter for one or more images in one or more of the image sequences is reduced so that the predicted data rate no longer exceeds the capacity of the buffer.

Data rate demand is typically precomputed for recorded image sequences such as movies, scheduled shows, and even some news broadcasts. The precomputation is equivalent to, for each value of the quantization parameter, presenting each image in the sequence to a variable-rate image encoder and recording the amount of data produced for that image with that value of the quantization parameter. The amount of data recorded is relatively small compared to the original image sequence.

Some image sequence encoding approaches, such as the MPEG-2 standard approach, use prediction from the encoded representation of one or more images to reduce the amount of data produced in encoding another image. In order that encoding controller 210 can accurately predict the amount of data that will be produced by encoding an image with a particular choice of quantization parameter, the amount of data produced by encoding that image cannot depend on a second variable, such as the selected quantization parameter for another image used for prediction. Although the amount of data could in principle be recorded for all combinations of quantization parameters for the image being encoded and for all the images used for prediction, this may result in excessive storage for the data rate demand. The solution chosen in this embodiment is to divide the image sequence into segments. A quantization parameter is chosen for an entire segment. The segments are chosen such that the amounts of data produced by images in one segment are independent of the choice of quantization parameter in another segment. In this embodiment, the same quantization parameter is selected by controller 210 for all images in a segment. The segments are formed to satisfy the constraint that any image whose encoding depends on the encoding of an image in a segment must also be in that same segment.

A second embodiment of the invention addresses the situation in which the data rate demand information is available for some but not all of the image sequences. FIG. 4 shows an arrangement in which three image sequences 412, 422, 432 are encoded, buffered in a finite capacity buffer 450, and multiplexed over a fixed-data-rate transmission path 460. As in the first embodiment, encoding controller 410 is responsive to data rate demands 414, 424 precomputed for image sequences 412, 424. A precomputed data rate demand is not available for image sequence 432, owing, for example, to the images being from a live video source such as a sporting event. In addition to being responsive to the precomputed data rate demands, controller 410 is also responsive to the amount of data in buffer 450 in a feedback arrangement. In this embodiment, data rate demands 414, 424 are used to estimate rather than predict exactly the amount of data in buffer 450. The feedback arrangement then compensates for the error in the estimated data rate and controls the amount of data in the buffer to not exceed the capacity of the buffer and to not empty the buffer.

In other embodiments the data rate demand may not be known exactly. For example, the future data rate demand available to the encoding controller may be an approximation of the true data rate demand. An encoding controller and a data buffer are used as in the second embodiment. A feedback connection between the buffer and the encoding controller is used to deal with the uncertainty in the prediction of the multiplexed data rate in a similar arrangement as shown in FIG. 4. In the second embodiment, the uncertainty in the multiplexed data rate resulted from one of the image sequences not having a precomputed data rate demand. In this embodiment, the uncertainty results from having approximations of the true data rate demand for all the image sequences.

In another embodiment, one or more image sequences are encoded and recorded on a bounded capacity storage device. For example, one or more prerecorded movies are stored on a storage disk such as a CD-ROM. In order to make use of as much of the available storage on the device as possible, the precomputed data rate demands for all of the image sequences are used to select sequences of quantization parameters for the image sequences. Each image sequence is then encoded and recorded in turn using its selected sequence of quantization parameters.

The encoding controllers in the preferred embodiments can implement a variety of optimization algorithms to choose the sequence of encoder controls. In addition, the encoding control strategy does not necessarily have to reduce the image quality for all sequences in a "fair" manner. Some sequences, such as a high fidelity movie, may have higher priority for data rate than other sequences.

In a related embodiment of the invention, in addition to determining the delays and quantization parameters for a set of image sequences, the particular set of sequences for encoding and multiplexing over a communication channel is selected from a larger set of possible sequences. The selection is based on the precomputed data rate demands for each of the set of possible image sequences.

Other embodiments are within the scope of the following claims. For example, other types of signals than image sequences can be encoded and multiplexed in similar arrangements. In addition, various techniques for controlling the output rate of variable-rate encoders, other than controlling a quantization resolution, can be used. Also, there may not be a "hard" capacity constraint in the communication channel or storage device. The data rate demand information can be used to optimize any of a number of criteria. In addition, the quantization parameter for a variable-rate image encoder does not necessarily have to be chosen to be uniform over an entire image, such as by choosing Q on a block-by-block basis. Also, different image quality values could be chosen for different types of images, for example images encoded with prediction could use a different image quality control than images not coded with prediction.

What is claimed is:

1. A method of encoding a first sequence of image frames to produce a first stream of encoded data representing the image frames, wherein the amount of encoded data generally depends on the value of an encoding parameter used in the encoding process, the method comprising:

computing the amount of encoded data that would be produced by encoding a plurality of the image frames for each of a plurality of values of the encoding parameter; and selecting a value of the encoding parameter to be used for encoding of the plurality of image frames based on the amount of encoded data produced for the selected value.

2. The method of claim 1, wherein the steps of claim 1 are followed for a second sequence of image frames, wherein the second sequence of image frames is encoded to produce a second stream of encoded data representing the image frames, and wherein the first and second streams of encoded data are combined to form a combined stream of encoded data.

3. The method of claim 2, wherein the first stream of encoded data is multiplexed with the second stream of encoded data.

4. The method of claim 3, further comprising selecting a relative delay between the first and second streams of encoded data to reduce peaks in the data rate of the combined stream.

5. The method of claim 2, wherein the combined stream of encoded data is stored in a buffer of limited data volume.

6. The method of claim 5, wherein the values of the encoding parameter used for final encoding are selected to maintain a desired amount of data in the buffer.

7. The method of claim 6 wherein the volume of data currently stored in the buffer is also used in selecting the values of the encoding parameter.

8. The method of claim 1 or 2, wherein the encoding parameter is a quantization parameter.

9. The method of claim 1 or 2, wherein the first and second sequences of image frames are prerecorded sequences.

10. The method of claim 2, wherein the combined first and second data streams are transmitted over a communication channel of limited data rate capacity.

11. The method of claim 2, wherein the encoding comprises predictive encoding and the frames over which the same value of the encoding parameter is used are chosen so that the amounts of data produced by images from one sequence of frames is independent of the choice of encoding parameter for another sequence of frames.

12. The method of claim 1, wherein the step of computing the amount of encoded data comprises preliminarily encoding the plurality of image frames for each of a plurality of values of the encoding parameter.

13. The method of claim 1, wherein the step of computing the amount of encoded data comprises computing an approximation of the amount of encoded data.

14. The method of claim 1, wherein each sequence of image frames comprises a plurality of frames.

15. The method of claim 2, wherein at least a third sequence of image frames is encoded to produce a third stream of encoded data, and a selection is made of a plurality, but fewer than all, of the streams of encoded data to form the combined stream of encoded data, and wherein the combined stream is transmitted over a data rate constrained communication channel or stored on a data volume constrained storage medium, and wherein the selection of a plurality of streams of encoded data is made so that the combined stream has a data rate or data volume consistent with the constraints of the communication channel or the storage medium.

16. The method of claim 1, wherein the step of computing the amount of encoded data for each value of an encoding parameter is performed in advance for each of a plurality of sequences of image frames making up a first motion picture segment, and the amounts of encoded data for each sequence of image frames are stored as a first set of data rate values.

17. The method of claim 15, wherein the first motion picture segment is encoded by reading the first set of data rate values for a sequence of image frames, selecting a value of the encoding parameter based on the first set of data rate values, encoding the sequence of image frames using the selected value, and repeating the process for the next sequence of image frames.

18. The method of claim 16, further comprising buffering the outputs of the encoding in a buffer, and transmitting the contents of the buffer over a capacity limited communication channel, and wherein the selection of the value of the encoding parameter includes selecting the value based on both the data rate values and the amount of data stored in the buffer.

19. The method of claim 16, wherein the step of computing the amount of encoded data is performed in advance for each of a plurality of sequences of image frames making up a second motion picture segment to be encoded along with the first motion picture segment, and the amounts of encoded data for each sequence of image frames are stored as a second set of data rate values, and wherein the step of selecting a value of the encoding parameter is based on both the first and second sets of data rate values.

* * * * *

UNITED STATES PATENT AND TRADEMARK OFFICE
CERTIFICATE OF CORRECTION

PATENT NO. : 6,181,821 B1
DATED : January 30, 2001
INVENTOR(S) : Jae S. Lim

Page 1 of 1

It is certified that error appears in the above-identified patent and that said Letters Patent is hereby corrected as shown below:

<u>Column 8,</u>
Line 21, "claim 15" should be -- claim 16 --.
Line 28, "claim 16" should be -- claim 17 --.
Line 35, "claim 16" should be -- claim 17 --.

Signed and Sealed this

Fourteenth Day of May, 2002

*Attest:*

*Attesting Officer*

JAMES E. ROGAN
*Director of the United States Patent and Trademark Office*